(12) United States Patent
Wiard

(10) Patent No.: X4974
(45) Date of Patent: Jan. 26, 1828

(54) PLOUGH

(76) Inventor: William Wiard

William Ward

Letters Patent Issued January 26th 1828

The Schedule referred to in these Letters Patent, & making part
of the same, containing a description in the words of the said
William Ward himself of his improvement in the Plough.

---

My improvement consists in the mode of putting on the
edge in the plan of locking in the main land side to the
mould board in the mode of attaching an additional side to
the lower portion of the land side in placing a whole thimble in
the main land side immediately behind the handle & directly opposite
the ½ half thimble, in the mould board into which a round is
received, & lastly in the manner in which the standard is construct-
-ed & situated.

My Plough is constructed of four different pieces viz.
The mould board, land side, edge, & the piece which is locked
on the lower portion of the land side to be hereafter described.
First. The mould board differs from the one in common use
in the following particulars. The edge is put on entirely different
from the manner in which it has heretofore been done in the
common plough. this piece is screwed on which renders it trou-
blesome to put it on & take it off as occasion required, the edge is
placed on my plough by means of a loop which is passed
thro'.... a corresponding mortice in the mould board. thro'
this loop after having passed through the mould board a wood
-en key is driven which secures it in its place & renders it ex-
tremely easy to be put on & removed at pleasure, in the edge are
two dowels or knobs that are received into two small round
semicircular excavations in the mould board, which they ex-
actly fit.- 2nd The short land side differs from the common
one in the manner in which the main land side is attached
to it- in its receiving in its lower extremity an additional piece to be hereafter described & in its being connected in
a peculiar manner with the standard which continues
up from this short land side nearly of the same breadth with
it until it passes through the main beam, 3dly the mould
board has a half thimble just behind the handle & immediate-
-ly above the lower loop into which the extremity of the han-
-dle is received, this half thimble is for the reception of one
extremity of the above mentioned [illegible] pin, this pin
cannot be removed until the handle which is attached
to the mould board is taken off, & it supplies the place
of the thimble which is here in part deficient. — These
are the principal points of difference in my plough
from all others as regards the mould board. Secondly —
the main land side there are three points in which this
differs from all others, namely, 1st the manner ~~[illegible]~~ in
which it is connected to the short land side of the mould
board, which is done in the following manner, the extremity
is received into an excavation formed by the projection of the
lower part of the short land side & the angle formed
by the connexion of the mould board with the short land side.
In addition to this resting place formed by the projection
of the lower part of the short land side, it has three others
namely two, [illegible] are received into its extremity from the
[illegible] land side and the main land side also rests ~~[illegible]~~
upon or laps over an other shelf or place of the short land
side about two inches & a half above the last mentioned,
in addition to these three connexions the main land side
has a projecting extremity or shoulder received into the short
land side about 4 inches above the last mentioned connexion
or resting place of the main land side. — From the mould
board about three inches from the extremity of the main land
side there projects as in all ploughs a small knob
which helps to preserve the extremity of the piece now described in its place. Upon the outside of this main land side S. at the lower part of it is placed an additional piece of nearly the same length, so as to cover the [illegible] of the mouldboard. this piece is connected to the main land side by two loops which pass thro' it, and two wooden keys are passed thro' them to secure the connexion. This piece is about two inches & a half or three inches in breadth & about half an inch in thickness. This piece receives nearly all if not quite all of the wear which takes place in the use of the plough, on the land side — Just behind the handle of the thimble above mentioned, & directly opposite to the half thimble also above mentioned between which the round or [illegible] pin is placed which keeps the mould board & the main land side at the proper distance apart. — the [illegible] land side [illegible] in between these two last described pieces about five inches. Instead of the loops mentioned in the specification above for the handles of the plough wrought iron staples may be used..

In testimony that the above is a true description or specification of my above mentioned improvement I have hereunto set my hand this 27th day of Dec. A. D. 1827

Witnesses

Thos. Copel....d

D. A. Watts

William [illegible]

Recd & Recorded June 7. 1841 & Exd. [illegible]

(913 words)